United States Patent
Braddick (10) Patent No.: US 11,546,470 B2
(45) Date of Patent: *Jan. 3, 2023

(54) SYSTEM AND METHOD OF REAL-TIME AUTOMATED DETERMINATION OF PROBLEM INTERACTIONS

(71) Applicant: Verint Americas Inc., Alpharetta, GA (US)

(72) Inventor: Hywel Braddick, Glasgow (GB)

(73) Assignee: VERINT AMERICAS INC., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/694,328

(22) Filed: Mar. 14, 2022

(65) Prior Publication Data

US 2022/0201123 A1 Jun. 23, 2022

Related U.S. Application Data (63) Continuation of application No. 17/012,915, filed on Sep. 4, 2020, now Pat. No. 11,277,515, which is a continuation of application No. 16/806,478, filed on Mar. 2, 2020, now Pat. No. 10,771,626, which is a continuation of application No. 16/356,601, filed on Mar. 18, 2019, now Pat. No. 10,601,991.

(51) Int. Cl.
| | | |
|---|---|---|
| H04M 3/00 | (2006.01) | |
| H04M 3/51 | (2006.01) | |
| G06F 16/908 | (2019.01) | |
| G06Q 10/06 | (2012.01) | |
| G06Q 30/02 | (2012.01) | |

(52) U.S. Cl.
CPC ........ H04M 3/5175 (2013.01); G06F 16/908 (2019.01); G06Q 10/063114 (2013.01); G06Q 30/0281 (2013.01); H04M 3/5183 (2013.01)

(58) Field of Classification Search
CPC ................. H04M 3/5175; H04M 3/51; H04M 2203/401; H04M 3/42221
See application file for complete search history.

(56) References Cited

U.S. PATENT DOCUMENTS 9,460,083 B2 10/2016 Fink

OTHER PUBLICATIONS

CallMiner, "Why real-time monitoring is so Important in the contact center," Dec. 5, 2013, https://callminer.com/blog/real-time-monitoring/.

*Primary Examiner* — Rasha S Al Aubaidi
(74) *Attorney, Agent, or Firm* — Christopher M. Scherer; DeWitt LLP (57) ABSTRACT

The present invention allows a CEC system to automatedly, and without human intervention, identify interactions that are likely in need of supervisor intervention. The system reviews all incoming and outgoing interactions for analysis by a metadata analytics service (MAS) software module. The MAS analyzes the interactions to generate interaction metadata, which is used by an interaction analysis engine (IAE) to score the quality of the interaction. If the quality of the interaction is not sufficient, the system marks the interaction as being a problem interaction and notifies a supervisor of the interaction. This ensures the intelligent and dynamic determination of interactions that require additional assistance and assures notification to a supervisor.

20 Claims, 3 Drawing Sheets

SYSTEM AND METHOD OF REAL-TIME AUTOMATED DETERMINATION OF PROBLEM INTERACTIONS

CROSS-REFERENCE TO RELATED APPLICATIONS

The present application is a continuation of U.S. application Ser. No. 17/012,915, filed Sep. 4, 2020, which application is a continuation of U.S. application Ser. No. 16/806,478, filed Mar. 2, 2020, which application is a continuation of U.S. application Ser. No. 16/356,601, filed Mar. 18, 2019, the contents of which are hereby incorporated herein by reference in their entireties.

FIELD

The present disclosure is directed to systems and methods of automated computer analysis. Specifically, automated systems and methods of determining which current real-time interactions will benefit from supervisor attention and automatedly notifying supervisor of those interactions.

BACKGROUND

In modern high-volume customer engagement centers (CEC), there are a number of ways communication between a customer service representative (CSR) and a customer can take place. For example, communication in a CEC can take place over the telephone, through email, and text chat, among other known communication methods. In a CEC, supervisors are typically assigned to monitor and assist frontline Customer Service Representatives (CSR's). Supervisors are typically experienced staff with detailed knowledge of the business domain the CEC is dealing with. CSR's are typically less experienced and rely on supervisors to help with complex or difficult interactions with customers.

Supervisors within a CEC are responsible for ensuring CSRs are providing a consistently high level of customer service. Current CEC computerized systems help with this task by allowing supervisors to monitor CSRs interactions with customers. Interactions can be monitored as they occur. For example, the supervisor can view a list of phone conversations that are in progress and select to listen in on one or a supervisor can view a list of active text chat conversations and select to view the chat messages being sent between the CSR and customer. If the supervisor detects a problem, such as the customer becoming frustrated or the CSR being rude then the system allows them to take action. For example, the supervisor may provide guidance to the CSR (unseen to the customer) helping them to resolve the issue or the supervisor may join the conversation or replace the CSR in the conversation to resolve the issue.

However, current CEC systems rely on supervisors to manually select and determine which interactions to monitor. There are not as many supervisors as there are CSRs, so it is impossible for a supervisor to monitor every interaction. Therefore, supervisors must use their judgement to select interactions to monitor, guessing where their assistance may be necessary in order to maintain a high level of customer service.

The result is that supervisors miss incidents where customer service is compromised and the supervisor could have intervened to help if they had been aware. These incidents may be detected after the fact, if customer phones back to complain or the supervisor reviews an interaction retrospectively, but customer satisfaction will already have been negatively impacted in these scenarios. Ideally a supervisor would be able to know which interactions are likely to require supervisor intervention and be able to concentrate on those interactions. There is an unmet need in the art for a system capable of automatedly notifying supervisors of interactions that have a greater need for monitoring and supervision.

SUMMARY

The present invention overcomes the deficiencies in the prior CEC systems. The present invention is directed to a system and methods of providing supervisors with notification of current interactions that are most likely to benefit from supervision or to automatedly assign troubled interactions to a supervisor.

An embodiment of the present application includes a method for determining if an interaction is likely to require supervisor assistance. A metadata analytics service (MAS) unit receives an interaction. The MAS analyzes the interaction using a MAS software module and generates interaction metadata for the interaction. The MAS passes the interaction metadata to an interaction analysis engine (IAE). The IAE performs an analysis of the interaction metadata using an IAE software module and determines an interaction score for the interaction. The IAE compares the interaction score to an interaction qualify threshold and if the interaction score is above the interaction quality threshold, the IAE passes a notice of the interaction to a supervisor representative.

Another embodiment of the present application is a system for determining if an interaction is likely to require supervisor assistance. The system includes a processor and a non-transitory computer readable medium programmed with computer readable code that upon execution by the processor causes the processor to execute the above-mentioned method for determining interactions that are likely to require supervisor assistance.

Another embodiment of the present application is a non-transitory computer readable medium programmed with computer readable code that upon execution by a processor causes the processor to execute the above-mentioned method for determining interactions that are likely to require supervisor assistance.

The objects and advantages will appear more fully from the following detailed description made in conjunction with the accompanying drawings.

DETAILED DESCRIPTION OF THE DRAWING(S)

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

CEC systems allow CSRs to engage with customers in a controlled manner. By providing organized and integrated computer-based customer service resources and automated monitoring of incoming customer communication to determine the quality of the customer service interaction in real time, the CEC system can allow an organization to achieve several key benefits. These benefits will be increased through the dynamic automated updating of analysis rules. First, the system will ensure the dynamic intelligent determination of which customer service conversations would benefit from supervisor attention. Second, the CEC system's adaptive nature allows it to adjust to new protocols and real-time determinations of the current quality level of a customer service conversation. Third, intelligent automated identification of problem conversations will increase both the likelihood of rapid resolution and customer satisfaction.

In order for the system to make real-time determinations of conversations in need of supervisor assistance, the system continually analyzes an ongoing conversation which consists of numerous individual interaction instances where the interaction may be an incoming portion of the conversation from a customer or the interaction may be an outgoing portion of the conversation from the agent. In embodiments, it is desirable for the system to analyze the interaction to create metadata and then score the interaction according to predetermined criteria. This allows the system to ensure effective identification of problem conversations and proper notification of a supervisor. In an embodiment, it is desirable to provide the metadata for review as well as the interaction/utterance. In another embodiment, it is desirable to allow modification of the predetermined criteria. In yet another embodiment, it is desirable to allow storage of the interaction and/or the interaction metadata at various points in the process. In embodiments, it is desirable for the system to associate saved interactions and saved metadata with other saved interactions and metadata where the interactions are related.

In embodiments, it is desirable for the system to determine problem interactions based on the interaction score. In an embodiment, it is desirable that the interaction score be cumulative based on all previous related interactions. In another embodiment, it is desirable that the interaction score be unrelated to any previous related interactions. It is desirable that the system score interactions in real-time. In this manner the system intelligently identifies problem interactions as they are occurring so that a supervisor can intervene as soon as possible.

Figure 1:
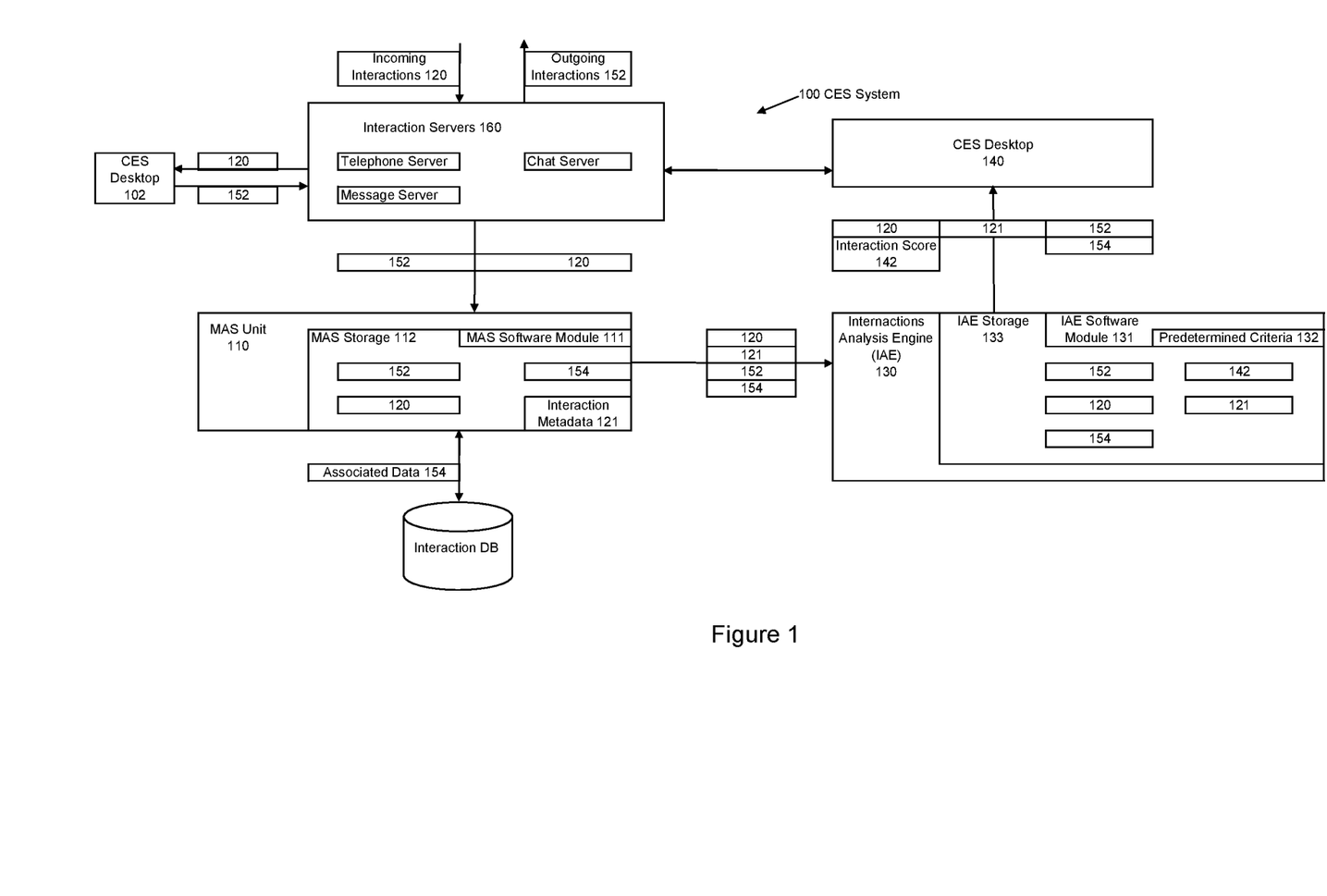
FIG. 1 depicts an exemplary embodiment of a CEC system for automatedly determining current interactions that are likely to benefit from supervision.

FIG. 1 depicts an exemplary embodiment of CEC system 100 for automatedly monitoring and identifying problem interactions and automatedly alerting supervisors of the problem conversation. Conversations are numerous interactions 120 and 152 that together form a conversation.

CEC system 100 includes at least one CEC desktop 102 used by a CSR for outgoing interactions 152 and for receiving incoming interactions 120. The CEC desktop 102 is connected to the CEC system Interaction servers 160, which includes, for example the telephone system, text transmission systems, chat server system, messaging server system, etc. such that the CSR can send outgoing interactions 152 and respond to incoming interactions 120 using the CEC desktop 102 either through audio, over the telephone system for example, or through text response, over email for example. It should be understood that the incoming interactions 120 may not be directly received by the CEC desktop 102. Incoming interactions 120 are received by the CEC system Interaction servers 160 and directed through a routing system/process and/or proceed through analysis to determine if other interactions are related to the incoming interaction 120 prior to being passed to the CSR at the CEC desktop 102. It should be understood that the CSR may or may not respond to the incoming interaction 120 through the same channel the incoming interaction 120 was received or through a different channel. For example, a customer may call into the CEC system and leave a voice message for the CSR and the CSR may respond to the customer through email response, rather than by calling the customer back, provided the CSR has available the customer email.

CEC system 100 includes a metadata analytics service (MAS) unit 110 having a MAS software module 111 and an optional MAS storage 112. MAS unit 110 may be a processor or a combination of a processing system and a storage system. MAS unit 110 receives interactions 120 and 152 from the CEC system Interaction servers 160 and analyzes them using MAS software module 111 to generate interaction metadata 121. Interactions may be an incoming interaction 120 received from outside the CEC system 100 or an outgoing interaction 152 received from inside the CEC system 100. Optionally, MAS unit 110 may also pass a copy of the interaction 120 and 152, and/or interaction metadata 121 to internal or external MAS storage 112 for permanent or temporary storage.

An interaction 120 and 152 is a single instance of a communication that may be part of a larger string of related interactions, wherein the interactions are communications between an entity outside the CEC system 100 and an entity inside the CEC system 100, for example, customers and CSRs, prospective customer and a supervisor, a person making an inquiry and an automated response system in the CEC system 100. Typically, incoming interactions 120 are communications received from customer, but could be received by prospective customers, individuals with inquires, or any other entity outside of the CEC system 100. Outgoing interactions 152 typically are communications from a customer service representative sent to a party outside the CEC system 100, but could be sent by a supervisor, an automated reply system, or any other way of sending a communication from inside the CEC system 100. It should be understood that these are merely examples of the parties that may be involved in communications and should not be considered limiting. As indicated above, the interactions 120 and 152 may include additional associated data 154 with each interaction 120 and 152, including, but not limited, to an indication of whether the interaction 120 and 152 is part of a series of related interactions, reference to any previously related interactions, metadata created by the previous related interactions, customer identification information, and CSR identification information. It should further be understood that the MAS system may also, upon receipt of the interaction 120 and 152, request and receive this additional associated data 154 from other subsystems of the CEC system such as an interaction storage database or some other system server where the associated data 154 is stored.

Interactions, both incoming interactions 120 and outgoing interactions 152, may be audio communication such as a telephone call, a voice message, a video chat, or any other type of audio communication, written communication such as an email, an online posting, a direct message from a customer or CSR, or any other written or audio communication. The analysis of incoming interactions 120 and outgoing interactions 121 may include a variety of techniques such as speech analytics or textual analytics of audio communications or textual communications between customers and CSRs. The incoming interaction 120 and outgoing interaction 152 can further include a wide variety of channels of data. These channels can include audio or textual transcripts of phone calls or web data, but can also include more discretely occurring events such as social medial posts, purchases, returns, or warranty claims.

The analysis of incoming interactions 120 and outgoing interactions 152 may include a variety of techniques such as speech analytics, textual analytics of audio communications or textual communications between customers and CSRs, sentiment analytics of audio and textual communications, and interaction routing analytics. The analysis may include, but is not limited to, determining the sentiment for the interaction, the conversation type of the interaction, the time elapsed since the incoming interaction was received and a responsive outgoing interaction has not been sent, the amount of transfers the incoming interaction has gone through, the amount of transfers the incoming interaction and all related previous incoming interactions have gone through, if the outgoing interaction deviates from standard scripts and the degree to which the script is deviated, if the outgoing interaction does not include information that is required to be provided, and determining the conversation type the incoming communication involves, for example returns or ordering. MAS software module 111 may also identify interactions 120 and 152 with red flag features, such as prohibited words, phrases, or expressions. Such red flag features, offensive sentiment, tone, or word choice, or grammatical or spelling errors in interactions 120 and 152 are indicated as part of the created interaction metadata 121. If the interaction 120 or 152 has additional data associated with it, the MAS 110 may or may not consider this additional data when performing the analysis. Further the MAS software module 111 may have a different set of analytics for incoming interactions 120 than for outgoing interactions 152. By way of non-limiting example, the MAS software module 121 may determine that many misspelled words in an outgoing interaction 152 indicates a frustrated sentiment and create interaction metadata 121 indicating that the CSR's sentiment is frustrated. However, the MAS software module 111 may determine that many misspelled words in an incoming interaction 120 indicates no bearing on the sentiment of the interaction or indicates a hurried sentiment.

Interaction metadata 121 may include, but is not limited to, the type of interaction, the number of times the incoming interaction 120 has been transferred/rerouted, the duration of time between the current interaction 120 or 152 and the previous related interaction, the sentiment, tone, and/or word choice of the sender, the type of interaction, intent and/or meaning of the interaction, presence of threats, and/or a list of business entities referenced in the interaction 120 or 152. By way of non-limiting example, the list of business entities referenced by interactions 120 and 152 may include at least one of a policy, an account, a customer, an involved or associated third party, and/or other parties identified in interactions 120 and 152. Interaction metadata 121 may also include, the skill type necessary to assist the incoming interaction 120, the amount of time between an incoming interaction 120 and an outgoing interaction 152 related to the incoming interaction 120, the number of times an incoming interaction 120 has been routed to a different CSR, which could be the number of times the current incoming interaction 120 has been routed, but could also include a combination of the number of times the current incoming interaction 120 has been routed along with the number of times any previous related incoming interactions 120 have been routed. Interaction metadata may also include customer identification, CSR identification and other statistical data about the customer or CSR involved in the interaction. In certain embodiments, the intent of the correspondence is expressed as a list of action points ordered by importance or urgency.

CEC system 100 also includes an Interaction Analysis Engine (IAE) 130 having an IAE software module 131 and optional IAE storage 133. IAE 130 may be a processor or a combination of a processing system and a storage system. IAE 130 receives incoming interactions 120 and 152 with interaction metadata 121 from MAS unit 110 and analyzes it using IAE software module 131 to assign an interaction score 142 to the interaction 120 and 152 based on predetermined criteria 132 within IAE software module 131. Optionally, IAE 130 may also permanently or temporarily save a copy of the interaction 120 and 152, the interaction metadata 121, and/or the interaction score 142 to internal or external IAE storage 133.

Predetermined criteria 132 include rules conditioned on interaction metadata 121, including, but not limited to, sentiment, red flag information, routing information, duration/time lapse information, CSR or CSR group availability, CSR or CSR group workload, and CSR or CSR group skills. Predetermined criteria 132 may be dynamically updated by a CSR or another party as any of the associated rules change. Depending on interaction metadata 121 and predetermined criteria 132, IAE 130 will determine an interaction score 142 to be assigned to the interaction 120 and 152. Different types of interaction metadata 121 may be weighed differently by the predetermined criteria 132. By way of non-limiting example, if the sentiment of an incoming interaction 120 is neutral and the number of times the incoming interaction has been rerouted/transferred is high, the interaction score 142 assigned may be higher than the interaction score 142 for an incoming interaction 120 that has a sentiment of mildly frustrates, but has not been rerouted/transferred. It should be understood that the predetermined criteria 132 that is applied to incoming interactions 120 may be different than the predetermined criteria 132 that is applied to outgoing interactions 152. By way of non-limiting example, an outgoing interaction 152 that has a sentiment of high frustration may have an interaction score 142 that is lower than an incoming interaction 120 that has a sentiment of high frustration.

The IAE software module 131 also compares the interaction score 142 to a interaction quality threshold. Interactions 120 and 152 with interaction scores 142 below the interaction quality threshold simply pass to their final destination without alerting a supervisor to the interaction 120 and 152. Interactions 120 and 152 with interaction scores 142 above the interaction quality threshold indicate that supervisor interaction may be required. Such interactions 120 and 152 are still passed to their final destination, but are also added, in real-time to be alerted to a supervisor. It is to be understood that the interaction 120 and 152 may be passed simultaneously or before the analysis is complete in determining whether it should also be alerted to a supervisor. A supervisor can be a specific supervisor, a group of supervisors, a specific queue, or a dynamically updated listing of problem interactions that is accessible by all supervisors. For example, an interaction 120 and 152 that fails the interaction quality threshold may be passed directly to a specific supervisor that has skills in the interaction type, may be passed to a specific supervisor who assisted on a previously related interaction, or may be passed directly to a supervisor or a queue of supervisors that has immediate ability to review the interaction. In another embodiment, an interaction 120 and 152 that fails the interaction quality threshold may be places on a notice list for interactions needing supervision, possibly along with information relating to why supervision is advisable, and a supervisor may decide which interactions to monitor. It should be understood that these are merely examples of how notice of the problem interaction is delivered to a supervisor or a group of supervisors. The importance of the notification is that it be done in real-time such that the supervisor can assist in the interaction as soon as it is determined that assistance is needed. Optionally, if IAE determines to pass the interaction 120 and 152 to a supervisor, IAE 130 may also pass interaction metadata 121 and/or interaction score 142 to the same destination as the interaction 120 and 152.

Interaction quality thresholds may vary according to the type of interaction 120 and 152 and the channel on which the interaction 120 and 152 occurs. For example, an email message directly replying to a written communication from an important customer may have a much lower interaction quality threshold than a general social media post to a high-volume account or a minor notice posted to the CSR's company intranet. The supervisor staff or another entity may update any of the interaction quality thresholds as needed to ensure excellent communications.

Supervisors may be identified or grouped by level of authority or skill, skill set, product or service line, department, assigned customers or accounts, prior customer interactions, any other quality, or any combination of qualities. Queues and queue groups may be associated with a level of urgency or importance, with one or more specific issues, types of issue, products, services, product lines, service lines, customers, accounts, departments, or groups of departments, any other quality, or any combination of qualities. Supervisor groups and queue groups may be predetermined or created and updated dynamically to fit current or anticipated needs.

In the exemplary embodiment, CEC system 100 also includes at least a second CEC desktop 140 used by the supervisor for receiving notice of the problem interaction, and optionally receiving the interaction 120 and 152, the interaction metadata 121, and interaction score 142. The CEC desktop 140 is connected to the CEC system 100 including the CEC phone system and textual communication system. The supervisor, along with the CEC desktop 140 is also connected to the CEC system interaction servers 160. The CEC desktop 140 not only allows the supervisor to be notified of the problem interaction, but also allows the supervisor to take any number of actions associated with the problem interaction, including, but not limited to, sending suggestions to the CSR to aid in the interaction, sending an outgoing interaction 152 directly to the sender of an incoming interaction 120, if the interaction is a phone conversation, allowing the supervisor to listen in on the interaction, allowing the supervisor to become a third-party in the interaction, and allowing the interaction to be transferred directly to the supervisor. It should be understood that how the supervisor assists in an interaction may be determined by the supervisor through review of the information provided for the problem interaction and use of the CEC desktop 140 or, in embodiments, the IAS 130 may automatically determine how the supervisor assists in the interaction based on the interaction score 142. CEC desktop 102 and 140 may also receive input for updating predetermined criteria 132 and/or the interaction quality threshold.

Figure 2:
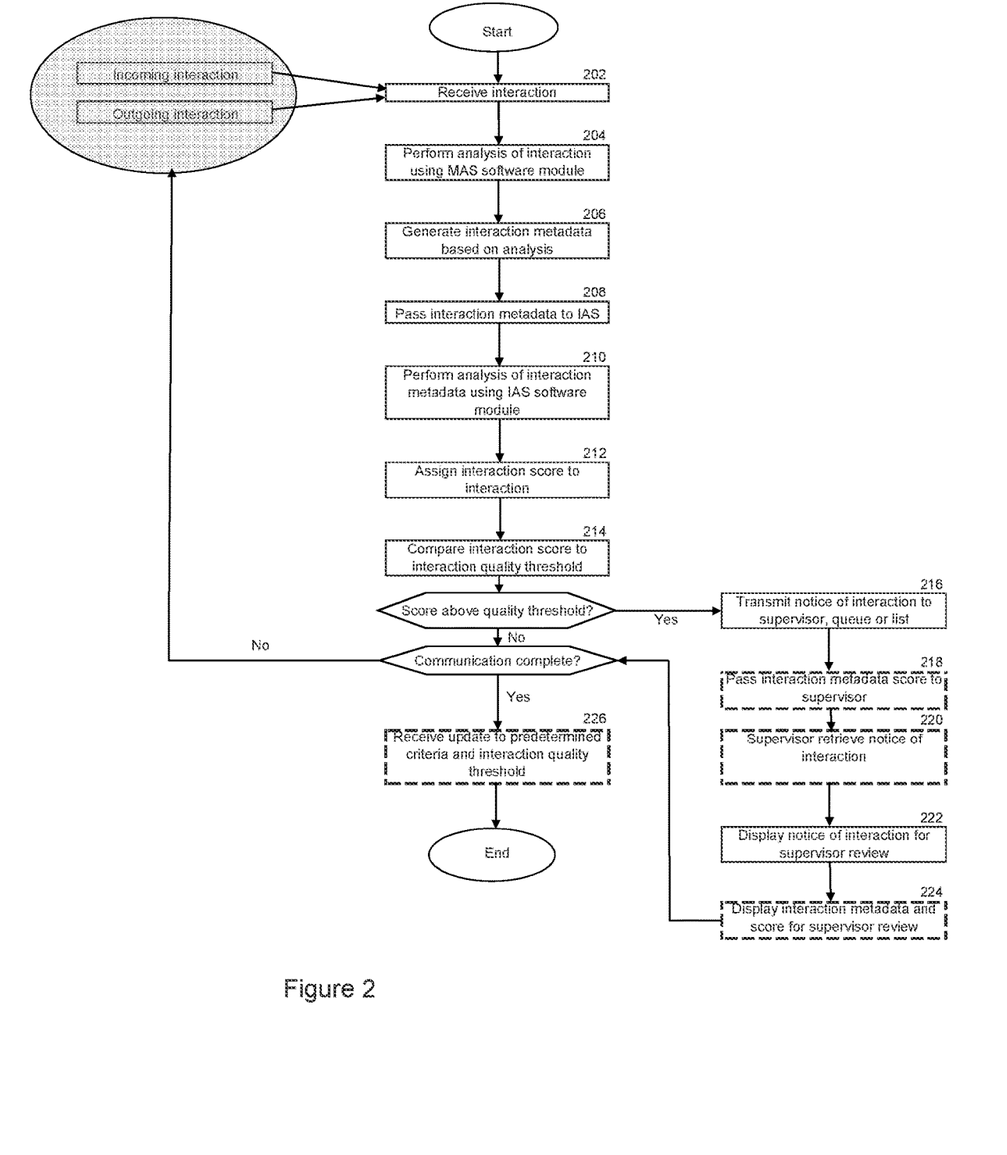
FIG. 2 depicts a flowchart of an exemplary embodiment of a method of automatedly determining current interactions that are likely to benefit from supervision.

FIG. 2 depicts a flowchart of an exemplary embodiment of method 200 for automatedly determining current interactions that are likely to benefit from supervision.

In step 202, the MAS unit receives an interaction 120 or 152. An interaction is either an incoming interaction 120 received from outside the CEC system or an outgoing interaction 152 received from inside the CEC system.

In step 204, the MAS unit performs an analysis of the interaction 120 and 152 using the MAS software module. The analysis may evaluate the interaction's content, existing attached metadata, header data, and attachments.

In step 206, the MAS unit generates interaction metadata 121 for the interaction 120 and 152 based on the analysis of step 204.

In step 208, the MAS unit passes the interaction 120 and 152 and the associated interaction metadata 121 to an IAE. Optionally, the MAS unit may also pass the interaction 120 and 152 and/or associated interaction metadata to MAS storage.

In step 210, the IAE performs an analysis of the interaction metadata 121 using an IAE software module. The analysis is based on predetermined criteria 132 in the IAE software module.

In step 212, the IAE assigns an interaction score 142 to the interaction 120 and 152 based on the analysis of step 210. Optionally, the IAE may also permanently or temporarily save a copy of the interaction 120 and 152, the interaction metadata 121, and/or the interaction score 142 to internal or external IAS storage.

In step 214, the IAE compares the interacts score 142 to a interaction quality threshold. The IAS software module may be programmed with multiple different interaction quality thresholds for different types of interactions and different types of channels the interaction occurs.

If the interaction score is above the interaction quality threshold, in step 216, the IAE transmits, in real-time, notice of the interaction to the supervisor. This type of interaction is considered a problem interaction or an interaction that would benefit for supervisor intervention. In embodiments, the IAE will transmit notice of the interaction directly to the supervisor. In embodiments, the IAE will transmit notice of the interaction to a dynamically created list of problem interactions that is accessible by supervisors wherein a supervisor can select a problem interaction from the list. Of importance is the list is created in real-time and only contains interactions that have current interaction scores above the interaction quality threshold.

In optional step 218, the IAE also transmits the interaction 120 and 152, the interaction metadata 121, and/or the interaction score 142 to the supervisor if the interaction score is above the interaction quality threshold.

In optional step 220, the supervisor retrieves the notice of the interaction from the queue or one of the queues in the queue group, or from the problem interaction list.

In step 222, the CEC desktop displays the notice of the interaction for supervisor review.

In optional step 224, the CEC desktop displays the interaction, the interaction metadata, and/or the interaction score for CSR review. In certain embodiments, this step may occur before or simultaneously with step 222.

If the interaction score is below the interaction quality threshold, steps 216-224 are skipped.

If the communication is complete, meaning there are no further incoming interactions 120 or outgoing interactions 152 being received in real time, at optional step 226, the IAE receives an update to the predetermined criteria and/or interaction quality threshold from the CSR, the supervisor or another party. In various embodiments, this step may occur before or after any other step in method 200.

If the communication is not complete, then the MAS receives the next interaction in the communication and at least steps 202-214 are repeated.

Figure 3:
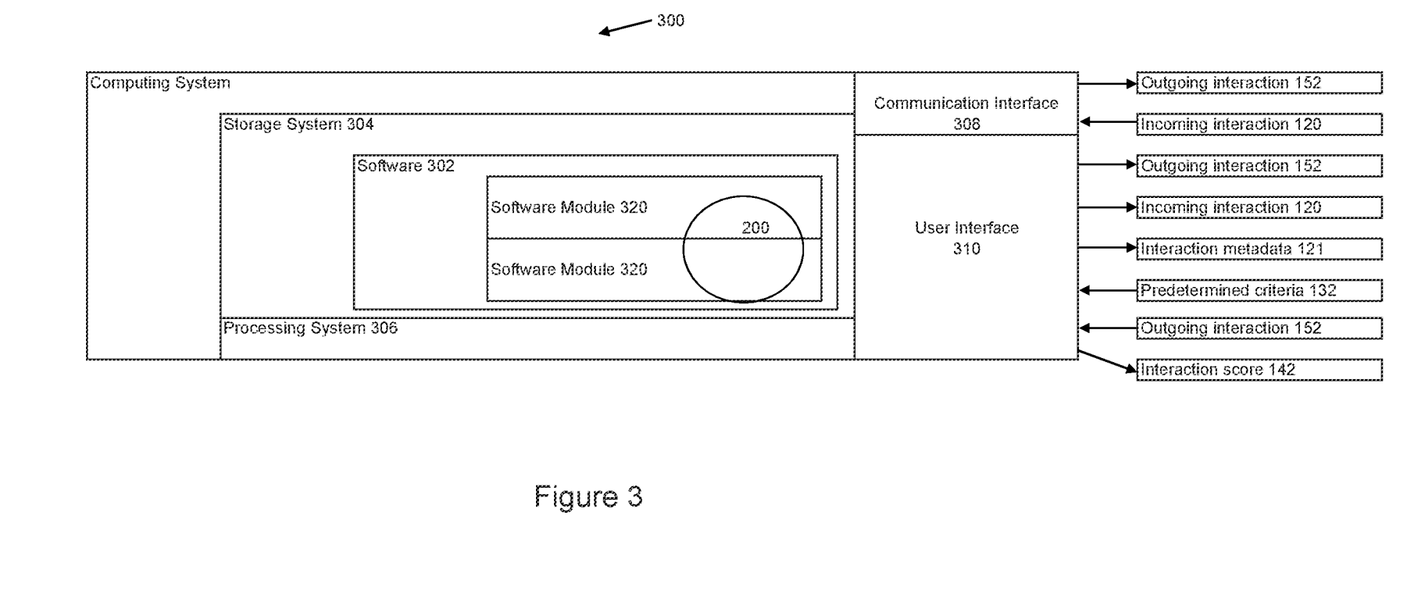
FIG. 3 depicts an exemplary embodiment of a system for automatedly determining current interactions that are likely to benefit from supervision.

FIG. 3 depicts an exemplary embodiment of system 300 for automatedly determining current interactions that are likely to benefit from supervision. System 300 is generally a computing system that includes a processing system 306, a storage system 304, software 302, a communication interface 308, and a user interface 310. Processing system 306 loads and executes software 302 from the storage system 304, including a software module 320. When executed by computing system 300, software module 320 directs the processing system 306 to operate as described in herein in further detail in accordance with the method 200.

Computing system 300 includes two software modules 320 for performing the functions of MAS software module 111 and/or IAE software module 131. Although computing system 300 as depicted in FIG. 3 includes two software modules 320 in the present example, it should be understood that one or more modules could provide the same operation. Similarly, while the description as provided herein refers to a computing system 300 and a processing system 306, it is to be recognized that implementations of such systems can be performed using one or more processors, which may be communicatively connected, and such implementations are considered to be within the scope of the description. It is also contemplated that these components of computing system 300 may be operating in a number of physical locations.

The processing system 306 can comprise a microprocessor and other circuitry that retrieves and executes software 302 from storage system 304. Processing system 306 can be implemented within a single processing device but can also be distributed across multiple processing devices or subsystems that cooperate in existing program instructions. Examples of processing systems 306 include general purpose central processing units, application specific processors, and logic devices, as well as any other type of processing device, combinations of processing devices, or variations thereof.

The storage system 304 can comprise any storage media readable by processing system 306, and capable of storing software 302. The storage system 304 can include volatile and non-volatile, removable and non-removable media implemented in any method or technology for storage of information, such as computer readable instructions, data structures, program modules, or other data. Storage system 304 can be implemented as a single storage device but may also be implemented across multiple storage devices or sub-systems. Storage system 304 can further include additional elements, such a controller capable of communicating with the processing system 306.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to system 300.

User interface 310 can include one or more CEC desktops 140 and 102, a mouse, a keyboard, a voice input device, a touch input device for receiving a gesture from a user, a motion input device for detecting non-touch gestures and other motions by a user, and other comparable input devices and associated processing elements capable of receiving user input from a user. The user interface 310 through the CEC desktops 140 and 102 is also integrated into the CEC system 100 allowing the user to access the CEC telephone system and the CEC text communications systems. Output devices such as a video display or graphical display can display notice of problem interactions, incoming interactions 120, outgoing interactions 152, interaction metadata 121, interaction score 142, CEC desktop 140 and 102, or another interface further associated with embodiments of the system and method as disclosed herein. Speakers, printers, haptic devices and other types of output devices may also be included in the user interface 310. A CSR, a supervisor or other staff can communicate with computing system 300 through the user interface 310 in order to view notice of problem interactions, incoming interactions 120, outgoing interactions 152, interaction metadata 121, interaction score 142, and in order to update predetermined criteria 132, interaction quality thresholds, manage an interaction, or any number of other tasks the CSR, supervisor or other staff may want to complete with computing system 300.

As described in further detail herein, computing system 300 receives and transmits data through communication interface 308. In embodiments, the communication interface 308 operates to send and/or receive data, such as, but not limited to, incoming interactions 120 and outgoing interactions 152 to/from other devices and/or systems to which computing system 300 is communicatively connected, and to receive and process client input, as described in greater detail above. The client input can include incoming interactions 120, details about a request, work order or other set of information that will necessitate an interaction between the client and the agent. Client input may also be made directly to the CSR, as described in further detail above.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. An automated computerized method for determining if an interaction is likely to require supervisor assistance, comprising:
   providing a customer engagement center system for receiving interactions, wherein the customer engagement center system includes a metadata analytics service unit and an interaction analysis engine;
   receiving, by the metadata analytics service unit, an interaction;
   generating, by the metadata analytics service unit, interaction metadata for the interaction based on a metadata analysis of the interaction, the interaction metadata including a sentiment of the interaction and one additional metadata parameter;

generating, by the interaction analysis engine, an interaction score for the interaction based on an interaction analysis of the interaction metadata;

comparing, by the interaction analysis engine, the interaction score to an interaction quality threshold; and passing, by the interaction analysis engine, a notice of the interaction to a supervisor representative if the interaction score is higher than the interaction quality threshold.

2. The method of claim 1, wherein the supervisor representative is one of an individual supervisor, a supervisor group, a queue, or a problem interaction list.

3. The method of claim 1, further comprising displaying the interaction metadata, the interaction score, or the interaction on a CEC desktop.

4. The method of claim 1, wherein the received interaction is one of the plurality of interactions received through the customer engagement center.

5. The method of claim 1, further comprising performing the metadata analysis of the interaction, by the metadata analytics service unit, prior to generating interaction metadata.

6. The method of claim 1, further comprising performing the interaction analysis of the interaction metadata, by the interaction analytics engine, prior to generating the interaction score.

7. The method of claim 1, wherein the one additional metadata parameter is one of a type of interaction for the interaction, duration of time between the interaction and a previous related interaction, or a number of times the interaction has been transferred.

8. An automated computer system for determining if an interaction is likely to require supervisor assistance, comprising:
   a customer engagement center system for receiving interactions, the customer engagement center system including;
   a metadata analytics service unit; and
   an interaction analysis engine, the metadata analytics service unit and the interaction analysis engine including:
   a processor; and
   a non-transitory computer readable medium programmed with computer readable code that upon execution by the processor causes the system to:
   receive, at the metadata analytics service unit, an interaction;
   generate, by the metadata analytics service unit, interaction metadata for the interaction based on a metadata analysis of the interaction, the interaction metadata including a sentiment of the interaction and one additional metadata parameter;
   generate, by the interaction analysis engine, an interaction score for the interaction based on an interaction analysis of the interaction metadata;
   compare, by the interaction analysis engine, the interaction score to an interaction quality threshold; and
   pass, by the interaction analysis engine, a notice of the interaction to a supervisor representative if the interaction score is higher than the interaction quality threshold.

9. The system of claim 8, wherein the supervisor representative is one of an individual supervisor, a supervisor group, a queue, or a problem interaction list.

10. The system of claim 8, wherein the system is further configured to display the interaction metadata, the interaction score, or the interaction on a CEC desktop.

11. The system of claim 8, wherein the received interaction is one of the plurality of interactions received through the customer engagement center.

12. The system of claim 8, wherein the system is further configured to perform the metadata analysis of the interaction, with the metadata analytics service unit, prior to generating interaction metadata.

13. The system of claim 8, wherein the system is further configured to perform the interaction analysis of the interaction metadata, with the interaction analytics engine, prior to generating the interaction score.

14. An automated computerized method for determining if a customer service conversation is likely to require supervisor assistance, comprising:
   Providing a customer engagement center system for receiving interactions, wherein the customer engagement center system includes a metadata analytics service unit and an interaction analysis engine;
   monitoring an ongoing customer service conversation with a metadata analytics service unit;
   generating, by the metadata analytics service unit, interaction metadata for the ongoing customer service conversation based on a metadata analysis of the ongoing customer service conversation, wherein the interaction metadata includes a sentiment of the ongoing customer service conversation and an additional metadata parameter;
   performing an interaction analysis of the interaction metadata using the interaction analysis engine to determine an interaction score for the ongoing customer service conversation;
   determining, by the interaction analysis engine, an interaction score for the ongoing customer service conversation based on an interaction analysis of the interaction metadata;
   comparing, by the interaction analysis engine, the interaction score to an interaction quality threshold; and
   transmitting, by the interaction analysis system, a notice of the ongoing customer service conversation to a supervisor representative if the interaction score is higher than the interaction quality threshold.

15. The method of claim 14, wherein the supervisor representative is one of an individual supervisor, a supervisor group, a queue, or a problem interaction list.

16. The method of claim 14, further comprising displaying the interaction metadata, the interaction score, or the interaction on a CEC desktop.

17. The method of claim 14, wherein the monitored ongoing customer service conversation is one of the plurality of ongoing customer service conversations received by the customer engagement center.

18. The method of claim 14, wherein the monitored ongoing customer service conversation includes a plurality of incoming interactions and a plurality of outgoing interactions.

19. The method of claim 14, further comprising repeating the generating of interaction metadata, the performing the interaction analysis, the determining the interaction score, the comparing the interaction score, and the transmitting the notice until the ongoing customer service conversation is completed.

20. The method of claim 14, wherein the additional metadata parameter is one of a type of interaction for the ongoing customer service conversation, duration of time between the ongoing customer service conversation and a previous related ongoing customer service conversation, or a number of times the ongoing customer service conversation has been transferred.

\* \* \* \* \*